(12) United States Patent
Suter et al.

(10) Patent No.: US 10,032,038 B2
(45) Date of Patent: Jul. 24, 2018

(54) FILE SYSTEM SUPPORT FOR ROLLING KEYS

(71) Applicant: Apple Inc., Cupertino, CA (US)

(72) Inventors: Christopher J. Suter, Saratoga, CA (US); Eric B. Tamura, Sunnyvale, CA (US); George K. Colley, Sunnyvale, CA (US); Mark S. Day, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 18 days.

(21) Appl. No.: 14/700,070

(22) Filed: Apr. 29, 2015

(65) Prior Publication Data

US 2016/0321460 A1    Nov. 3, 2016

(51) Int. Cl.
*G06F 21/62* (2013.01)
*H04L 9/14* (2006.01)
*G06F 21/60* (2013.01)

(52) U.S. Cl.
CPC ........ G06F 21/6209 (2013.01); G06F 21/602 (2013.01); H04L 9/14 (2013.01)

(58) Field of Classification Search
CPC ............................. G06F 21/6209; G06F 21/62
USPC .................................................. 713/189, 193
See application file for complete search history.

(56) References Cited

U.S. PATENT DOCUMENTS

| | | | | |
|---|---|---|---|---|
| 5,239,700 | A * | 8/1993 | Guenther | B60K 35/00 455/158.4 |
| 7,073,073 | B1 * | 7/2006 | Nonaka | G06F 21/10 380/277 |
| 8,099,607 | B2 | 1/2012 | Sandhu et al. | |
| 8,261,068 | B1 | 9/2012 | Raizen et al. | |
| 8,379,850 | B1 * | 2/2013 | Bridgford | H04L 9/003 380/37 |
| 8,498,417 | B1 * | 7/2013 | Harwood | H04L 67/1097 380/277 |
| 8,630,419 | B2 * | 1/2014 | Mori | H04N 7/1675 380/200 |
| 2006/0136735 | A1 | 6/2006 | Plotkin et al. | |
| 2008/0098236 | A1 * | 4/2008 | Pandey | G06F 11/1464 713/189 |
| 2010/0217987 | A1 * | 8/2010 | Shevade | G06F 21/6272 713/175 |
| 2014/0245012 | A1 | 8/2014 | Arya et al. | |
| 2014/0258725 | A1 | 9/2014 | Shea et al. | |
| 2015/0154121 | A1 * | 6/2015 | Schmier | G06F 12/1408 713/193 |

* cited by examiner

*Primary Examiner* — Dant B Shaifer Harriman
(74) *Attorney, Agent, or Firm* — Dickinson Wright RLLP (57) ABSTRACT

This application relates to a key rolling process for a file system of a computing device. The key rolling process allows for files to be transparently re-encrypted in a background process while still allowing applications to access files being re-encrypted. During re-encryption, a portion of the file is decrypted using a current key for the file and re-encrypted using a new key for the file. During re-encryption, the portion of the file can be relocated to another location in memory. Metadata associated with the file can be updated to include information pertaining to the location of the re-encrypted portion. The metadata can also be updated include information pertaining to how much of the file has been re-encrypted with the new key and how much of the file remains encrypted with the current key.

23 Claims, 6 Drawing Sheets

FILE SYSTEM SUPPORT FOR ROLLING KEYS

FIELD

The described embodiments relate generally to encryption algorithms for file systems. More particularly, the present embodiments relate to encryption algorithms for transparently re-encrypting a file of a file system by iteratively encrypting portions of the file and relocating the portions of the file to a location on disk that is different than an original location of the file.

BACKGROUND

Since the inception of wireless consumer electronics, accessibility to personal information of a user has become more prevalent. Concern over the safety of such personal information has given rise to advanced encryption algorithms. Although these algorithms have previously prevented hackers from accessing valuable data on certain devices, some algorithms may fail against more modern hacking techniques. For example, the prevalence of bots that can rapidly generate and guess passwords has made cracking certain encryption algorithms a relatively simple process where time is the only limiting variable. As a result, devices having file systems protected by simple encryption algorithms may occasionally be compromised, thereby making device users subject to data loss, and, in some instances, identity theft.

SUMMARY

This paper describes various embodiments that relate to systems, methods, and apparatus for encrypting a file system. In some embodiments, a method is set forth for implementing a background process for re-encrypting a file on a computing device. The method can include the steps of decrypting an encrypted portion of a file using a first key to generate a decrypted portion of the file. The encrypted portion of the file can be stored in a first memory location. The method can further include steps of encrypting the decrypted portion of the file using a second key to generate a new encrypted portion of the file, and writing the new encrypted portion of the file to a second memory location. While writing the new encrypted portion of the file to the second memory location, a portion of the file can remain encrypted with the first key at the first location. Furthermore, the method can include updating metadata associated with the file to include an indication of an amount of data of the file that has been re-encrypted using the second key.

In other embodiments, a computing device is set forth. The computing device can include a memory configured to store a file, and a key storage configured to store keys for encrypting the file. A first portion of the file can be encrypted using a first key and a second portion of the file is encrypted using a second key. The computing device can further include a processor configured to modify metadata associated with the file to include a first location of the first portion of the file in the memory and a second location of the second portion of the file in the memory. The first portion of the file can be re-encrypted with the second key in a background process configured to run simultaneous to an application executing at the computing device.

In yet other embodiments, a machine-readable non-transitory storage medium is set forth. The storage medium can store instructions that, when executed by a processor included in a computing device, cause the computing device to carry out steps that include decrypting a portion of a file using a first key. The portion of the file can be stored in a first location in a memory of the computing device. The steps can further include encrypting the portion of the file using a second key and storing the portion of the file in a second location. When the portion of the file is being encrypted with the second key, a different portion of the file can remain encrypted with the first key at the first location. Furthermore, the steps can include updating metadata associated with the file to indicate portions of the file that are encrypted with the first key and the second key. Additionally, the steps can include updating the metadata associated with the file to include data representative of the first location and the second location.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Encryption of electronic data has helped to securely establish a global network of devices in which sharing of the electronic data can be accomplished with minimal risk of the theft or fraud. Encryption is also used to securely transmit signals between components within a device. The popularity of many devices such as cell phones and laptops, combined with the prevalence of hacking, has caused device manufacturers to be constantly faced with the challenge of making device data more secure. Despite efforts and investments made to provide a more secure device architecture, device data can be occasionally compromised by malicious software designed to discover keys that are used to secure the device data. In some cases, the only limiting variable for some malicious software is time, therefore it is critical for device manufacturers to periodically re-encrypt data on a device with a new key. In this way, fraud and theft of electronic data can be avoided by generating new keys for a device before the malicious software has the time to guess the old keys. However, decrypting a file on a device using an old key and re-encrypting the file with a new key, also referred to a key rolling, has its own drawbacks. Specifically, key rolling can inhibit processor performance and consume power because of the amount of data that is processed when, for example, key rolling is performed across an entire file system. As a result, the user experience can be degraded. In order to resolve these issues, the embodiments discussed herein provide algorithms for key rolling that transparently re-encrypt data of a file system in a background process that improves both power and processor efficiency.

In some embodiments discussed herein, key rolling is performed transparently by allowing all or some portions of a file to be accessible by a program on a computing device while the file is being re-encrypted with a new key. When re-encryption is occurring, the program can attempt to access the file and be granted access to all portions of the file—even those portions that are being re-encrypted with the new key. As a result, a portion of the file can be encrypted with an old key and a different portion of the file re-encrypted with a new key. Depending on the size of the portion of the file being re-encrypted, the re-encryption will seem transparent to a user or process of the computing device that may be directing the program to access the file.

A key rolling program on the computing device can track the progress of the re-encryption of a file by updating metadata associated with the file. The metadata can include an offset value that indicates the location in the file where the re-encryption of the file last ended. For example, if a key rolling process for a file has not begun then the metadata can include data representing a null or zero value for the progress of the key rolling process. Furthermore, if the key rolling process for the file has successfully re-encrypted half of the file with a new key, the metadata for the file will include a value indicating half of the data in the file has been re-encrypted. Additionally, if the key rolling process for the file has successfully re-encrypted the entire file with the new key, the metadata for the file will include a value indicating that the file is encrypted entirely with the new key.

In some embodiments, the key rolling program can track the progress of the re-encryption of the file using a bitmap. The bitmap can be associated with the metadata and managed at least in part by the key rolling program. The bitmap can be a single or multi-dimensional array or tree structure for determining the portions of a file are encrypted with a specific key. A bitmap is useful when portions of the file encrypted with a new key may not be clearly identified from a single offset value. Additionally, in some instances it can be beneficial to perform key rolling non-sequentially such that certain portions of the file are skipped at a given time during key rolling. For example, if key rolling is to be performed on a file that is being used by an application, the key rolling program can skip sections of data of interest to the application. The bitmap associated with the metadata of the file can thereafter be updated to indicate the portions of the file that are encrypted with the new key and the portions of the file that are encrypted with the old key. In some embodiments, a file can be encrypted with more than two keys at a time. Furthermore, re-encryption of a file can be initiated by the key rolling program or any other application associated with a file that is to be encrypted or re-encrypted. In some embodiments, the file can be a group file that allows a group of people to access and edit the file. The file can be encrypted with multiple keys and each person in the group can have access to the multiple keys. When updates are made to the file by one or more person in the group, the updated portion of the file can be encrypted with one or more existing keys. However, if a person leaves the group and updates are made to the file subsequent to the person leaving the group, a new key can be generated and the updates to the file can be encrypted with the new key according to the key rolling process discussed herein. In this way, the person who left the group will be able to access any portions of the file except for those portions of the file that were created after the person left the group.

In some embodiments, the key rolling program can include a reserve operation for reserving portions of memory for newly encrypted portions of a file. In order to protect against loss of data that can occur from power loss or computer crashes, the key rolling program can copy portions of a file to be re-encrypted, and write the re-encrypted portion of data to the reserved portion of memory. In this way, if the computer operating the key rolling program crashes during a re-encryption of a portion of the file, only a copy of the portion of the file will potentially be lost. Additionally, by reserving portion of memory for the key rolling operation, memory fragmentation of files can be reduced. The metadata associated with the file can be updated to point to where the re-encrypted file is in memory. For example, the metadata can indicate (i) before re-encryption that a portion of the file is encrypted with an old key, and (ii) after re-encryption that a portion of the file is re-encrypted with the new key. As a result, any applications attempting to use the file can determine the appropriate key to access the file by referencing the metadata associated with the file.

The key rolling program can be scheduled to execute at different times. For example, the key rolling program can be scheduled to execute when a computing device operating the key rolling program is connected to an external power supply. The key rolling program can also be scheduled to execute when the computing device has entered an idle, locked, or low power mode. In this way, the impact of the key rolling program on the power and processing efficiency of the computing device can be mitigated. However, in some embodiments, the key rolling program can be scheduled to execute at any suitable time, including when a user is actively operating the computing device. In such embodiments, the key rolling program functions as a background process for transparently re-encrypting a file system of the computing device, as discussed herein.

These and other embodiments are discussed below with reference to FIGS. 1-6; however, those skilled in the art will readily appreciate that the detailed description given herein with respect to these figures is for explanatory purposes only and should not be construed as limiting.

Figure 1:
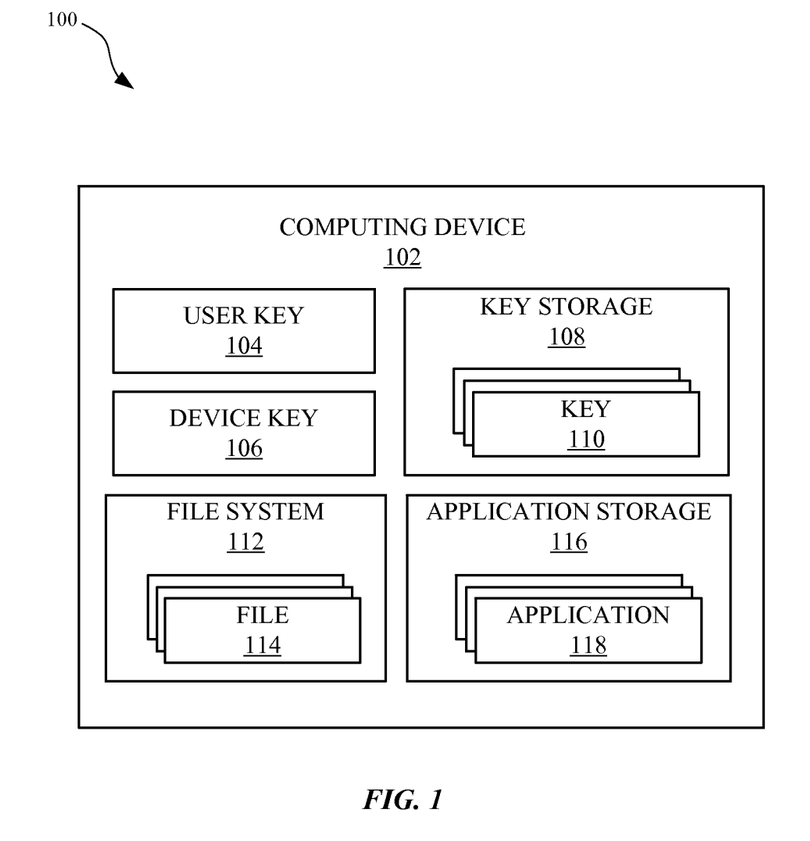
FIG. 1 illustrates a system diagram for a computing device that can perform key rolling according to the embodiments discussed herein.

FIG. 1 illustrates a system diagram 100 for a computing device 102 that can perform key rolling according to the embodiments discussed herein. The computing device 102 can be a cell phone, laptop, desktop, display, watch, media player, or any other computing device 102 suitable for storing encrypted data. The data stored by the computing device 102 can be encrypted using a user key 104 and/or a hardware key 106. The user key 104 can be a key that is created by a user or is otherwise uniquely associated with the user. Additionally, the user key 104 can be stored by the computing device 102 or provided to the computing device 102 through an interface of the computing device 102. In this way, data that is encrypted using the user key 104 can require the user to enter the user key 104 before the user can access the data. The computing device 102 can also include a hardware key 106, which can be provided by a manufacturer of the computing device 102. In this way, the hardware key 106 can be unique per computing device 102. In some embodiments of the computing device 102, both the hardware key 106 and the user key 104 are used to encrypt data. In other embodiments of the computing device 102, the hardware key 106 is used to encrypt the user key 104, and the resulting encrypted user key is used to encrypt certain files 114 in a file system 112 of the computing device 102. For example, certain files 114 that are used during a startup of the computing device 102 can be encrypted using the encrypted user key, and therefore certain features of the computing device 102 can be unavailable until the user enters the user key 104.

A key storage 108 can also be provided in the computing device 102 for storing keys 110 that can be used to encrypt files 114 of the file system 112 according to different policies associated with the keys 110. For example, some keys 110 can only be made available after a user has activated the computing device 102 for the first time, therefore any files encrypted with such keys will only be available after activation of the computing device 102. Additionally, some keys 110 can only be made available after the computing device 102 has connected to an external device such as a network device. As a result, any files encrypted with such keys will only be available when the computing device 102 has connected to the external device. Encrypting the files 114 in this way limits the availability of the files 114 to applications 118 stored in an application storage 116 of the computing device 102.

Each application 118 can request one or more keys 110 from the key storage 108 before accessing files 114 from the file system 112. The granting of keys 110 to applications 118 and deletion of keys 110 from memory can be based on the policies in place for each key 110. This prevents malicious applications from being loaded on the computing device 102 and thereafter accessing the file system 112 without first obtaining a key 110. Unfortunately, some malicious applications can be designed to frequently make attempts to access the files 114 by guessing key values. In some cases, given a long enough time frame, the malicious applications can succeed, therefore the computing device 102 can frequently or periodically generate new keys to replace old keys. A key rolling program on the computing device 102 can be used to re-encrypt files 114 in the file system 112 with new keys. The key rolling program can initially decrypt a portion of a file 114 using an old key, re-encrypt the file 114 using a new key, and thereafter store the re-encrypted portion of the file 114 in a different location than the previous location of the portion of the file.

Figure 2:
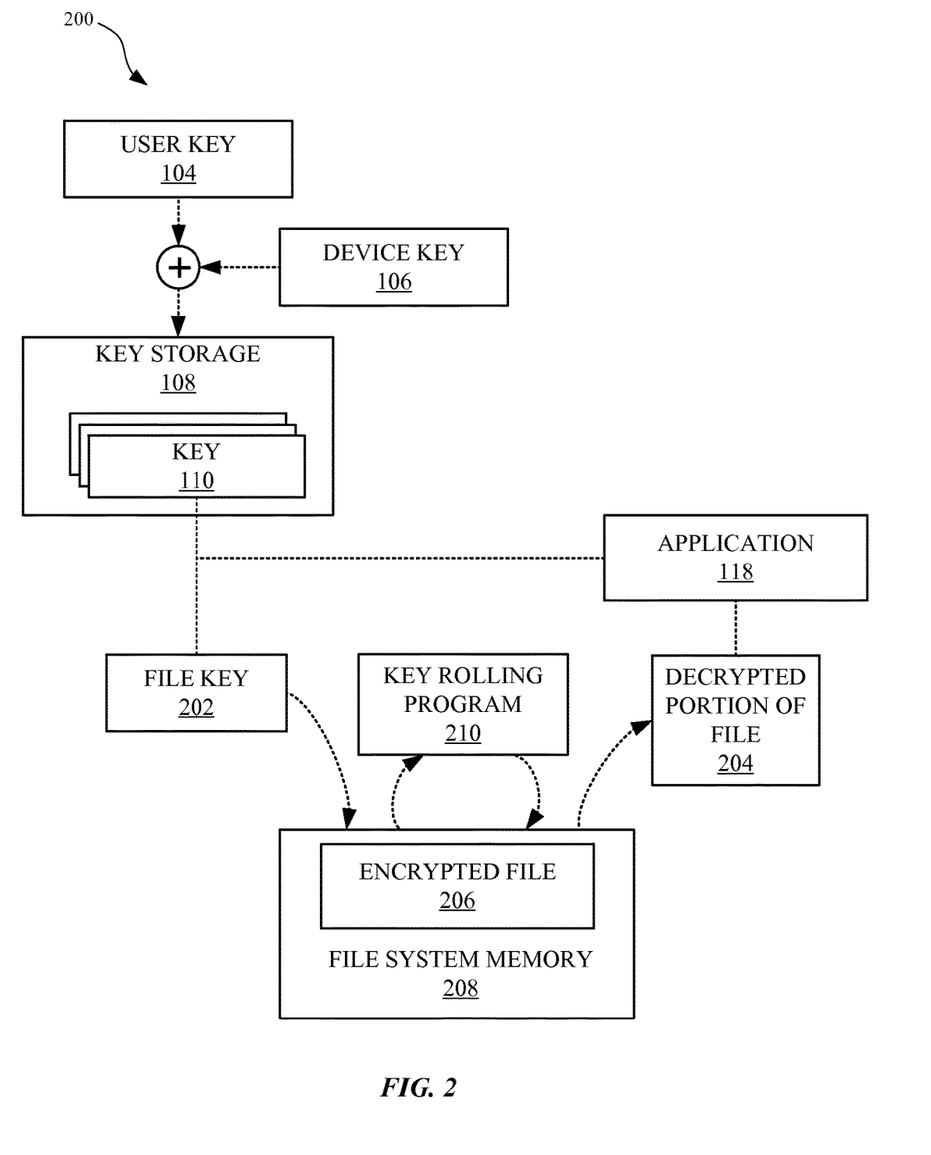
FIG. 2 illustrates a flow diagram of an application accessing an encrypted file.

FIG. 2 illustrates a flow diagram 200 of an application accessing an encrypted file. Specifically, FIG. 2 provides an example of a process that can occur while a key rolling program 210 is executing in the background of the process. For example, an application 118 can attempt to access a decrypted portion of a file 204 stored as an encrypted file 206 in a file system memory 208. However, in order in order to gain access to one or more file keys 202 that can unlock the encrypted file 206, a user key 104 and hardware key 106 are used to first unlock a key storage 108. Once the key storage 108 is unlocked using the user key 104 and hardware key 106, the key storage 108 can provide various keys in response to requests received from the application 118. For example, the file key(s) 202 can be provided by the key storage 108 to decrypt the encrypted file 206. In some embodiments, the encrypted file 206 can be decrypted using one or more keys that are generated using the hardware key 106. The decrypted portion of the file 204 can thereafter be accessible to the application 118 while the key rolling program 210 is decrypting and re-encrypting a different portion of the encrypted file 206, as discussed herein. In this way, the key rolling program 210 will be a transparent process relative to the application 118, which is able to access different portions of the encrypted file 206.

Figure 3:
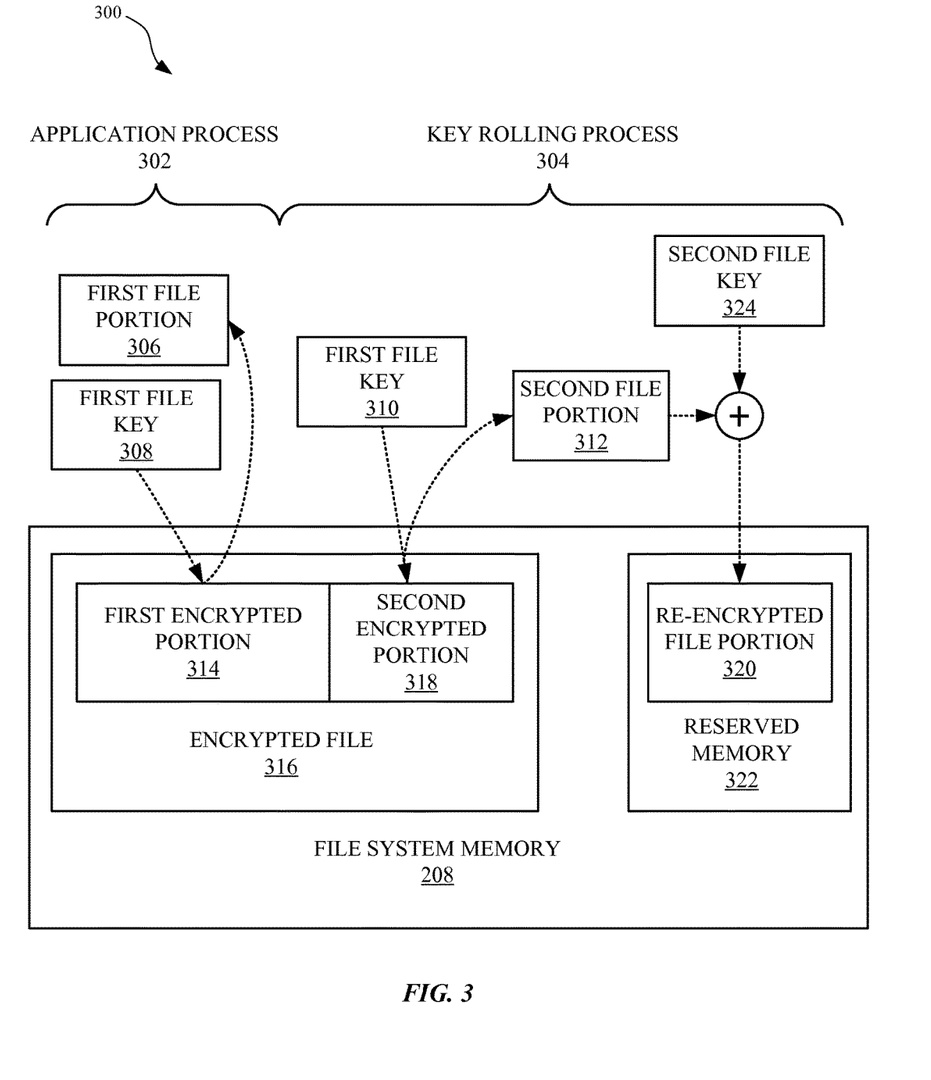
FIG. 3 illustrates a flow diagram of an application process operating simultaneous to a key rolling process.

FIG. 3 illustrates a flow diagram 300 of an application process 302 operating with a key rolling process 304. Specifically, the flow diagram 300 provides an example of a key rolling process 304 that can re-encrypt portions of an encrypted file 316 and relocate a re-encrypted file portion 320 of the file in the file system memory 208. The application process 302 can involve obtaining a first file key 308 for accessing a first encrypted portion 314 of an encrypted file 316. Once obtained, the first file key 308 can be used to decrypt the first encrypted portion 314 so that a first file portion 306 (i.e., the first encrypted portion 314 decrypted using the first file key 308) can be accessed during the application process 302. Simultaneous to the application process 302 accessing the first file portion 306, the key rolling process 304 can also obtain the first file key 308 for decrypting a second encrypted portion 318 of the encrypted file 316. Once decrypted, the key rolling process 304 can re-encrypt a second file portion 312 (i.e., the second encrypted portion 318 decrypted using the first file key 308) using a second file key 324. The second file key 324 can be an updated file key that was created after the first file key 308. Additionally, it should be noted that any key discussed herein (e.g., the first file key 308 and/or the second file key 324) can be a single key, a key encrypted using one or more keys, and/or one or more keys encrypted with additional data (e.g., salt).

The second file portion 312 can be stored in the file system memory 208 as a re-encrypted file portion 320. In some embodiments of the key rolling process 304, the re-encrypted file portion 320 is stored in reserved memory 322. The reserved memory 322 represents a portion of a memory that can be initially reserved at the beginning of the key rolling process 304 in order to mitigate fragmentation of files. Once the key rolling process 304 is complete for the entire encrypted file 316, the entire encrypted file 316 will be re-encrypted with the second file key 324 and be located in the reserved memory 322. Thereafter, the previous location of the encrypted file 316 can be marked or otherwise indicated as unused space in the file system memory 208. However, in some embodiments, the re-encrypted can occupy the same location in memory as the encrypted file 316 once re-encrypted with the second file key 324.

The key rolling process 304 can iteratively re-encrypt individual portions of data that are the same size or different size per iteration. For example, in some embodiments, each iteration can re-encrypt a 2 megabyte portion of a file. In other embodiments, each iteration can re-encrypt a portion that is greater than or less than 2 megabytes. The key rolling process 304 can, in some embodiments, select different sizes of a file to re-encrypt for each iteration. For example, if power is low or the processor has a number of tasks scheduled already, the size of data re-encrypted per iteration of the key rolling process 304 can be reduced. Thereafter, when the power is no longer low or the processor has a reduced number of tasks scheduled, the size of the data re-encrypted per iteration of the key rolling process 304 can be increased.

Figure 4:
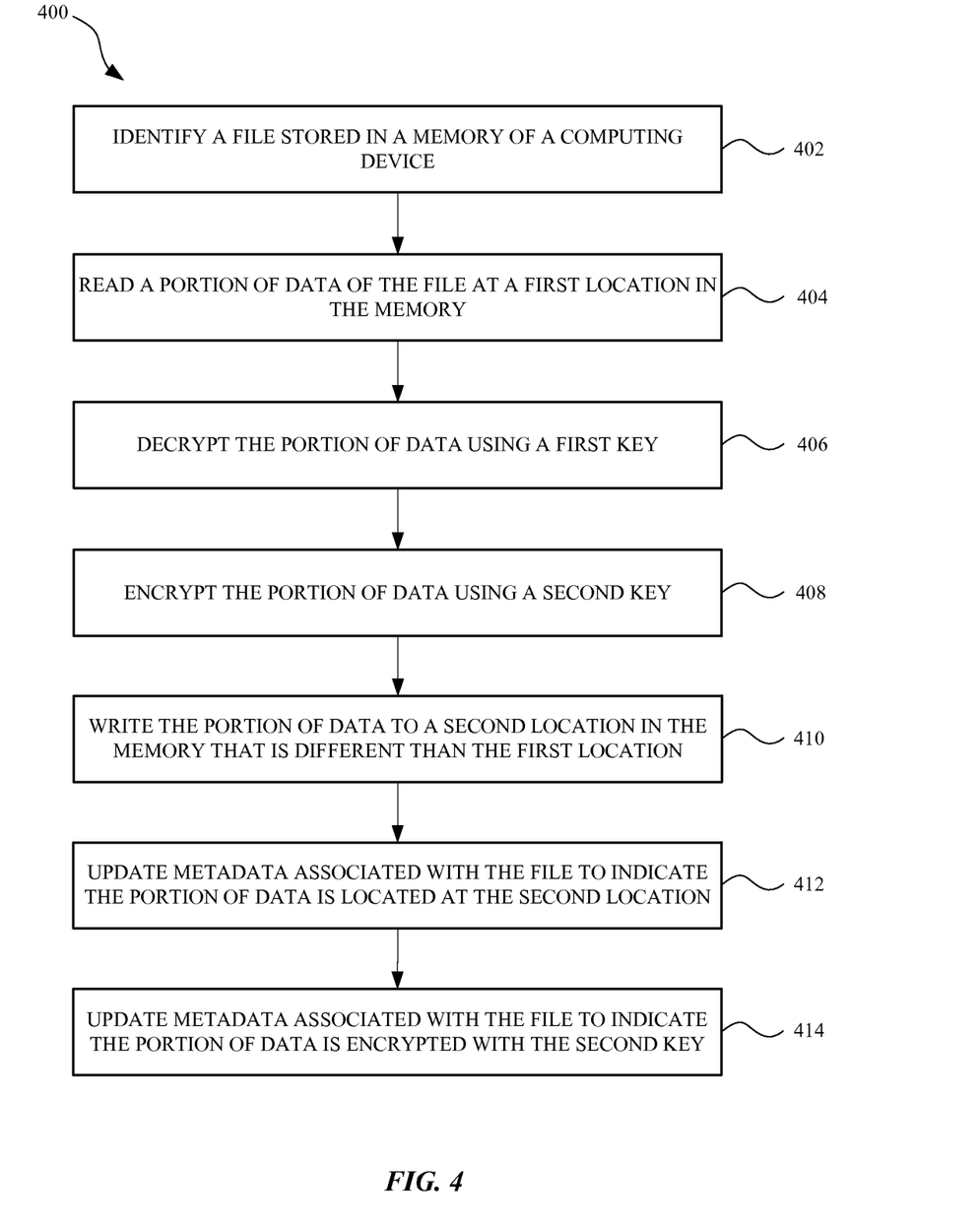
FIG. 4 illustrates a method for performing a key rolling process on a file of a computing device.

FIG. 4 illustrates a method 400 for performing a key rolling process on a file of a computing device. The method 400 can be performed by any suitable component or module not limited to an application, a processor, or a kernel of the computing device. The method 400 can include a step 402 of identifying a file stored in a memory of the computing device. The file can be any suitable type of file stored by a computer not limited to media data, system data, graphics data, hardware data, device data, or any other data suitable for encryption. The method 400 can also include a step 404 of reading a portion of data of the file at a first location in the memory. At step 406, the portion of data is decrypted using a first key. The decrypted portion of data, at step 408, is encrypted using a second key. At step 410, the portion of data encrypted using the second key is written to a second location in the memory that is different than the first location. Optionally, at step 412, metadata associated with the file is updated to indicate that the portion of data is located at the second location. Additionally, the metadata can optionally be updated, at step 414, to indicate that the portion of data has been encrypted using the second key. In some embodiments, the metadata corresponding to one or more files in the memory can maintain a history of keys that have been used to encrypt the one or more files. In other embodiments, the metadata only keeps track of the keys that are currently being used to encrypt a file and expunges data corresponding to keys that were previously used to encrypt the file.

Figure 5:
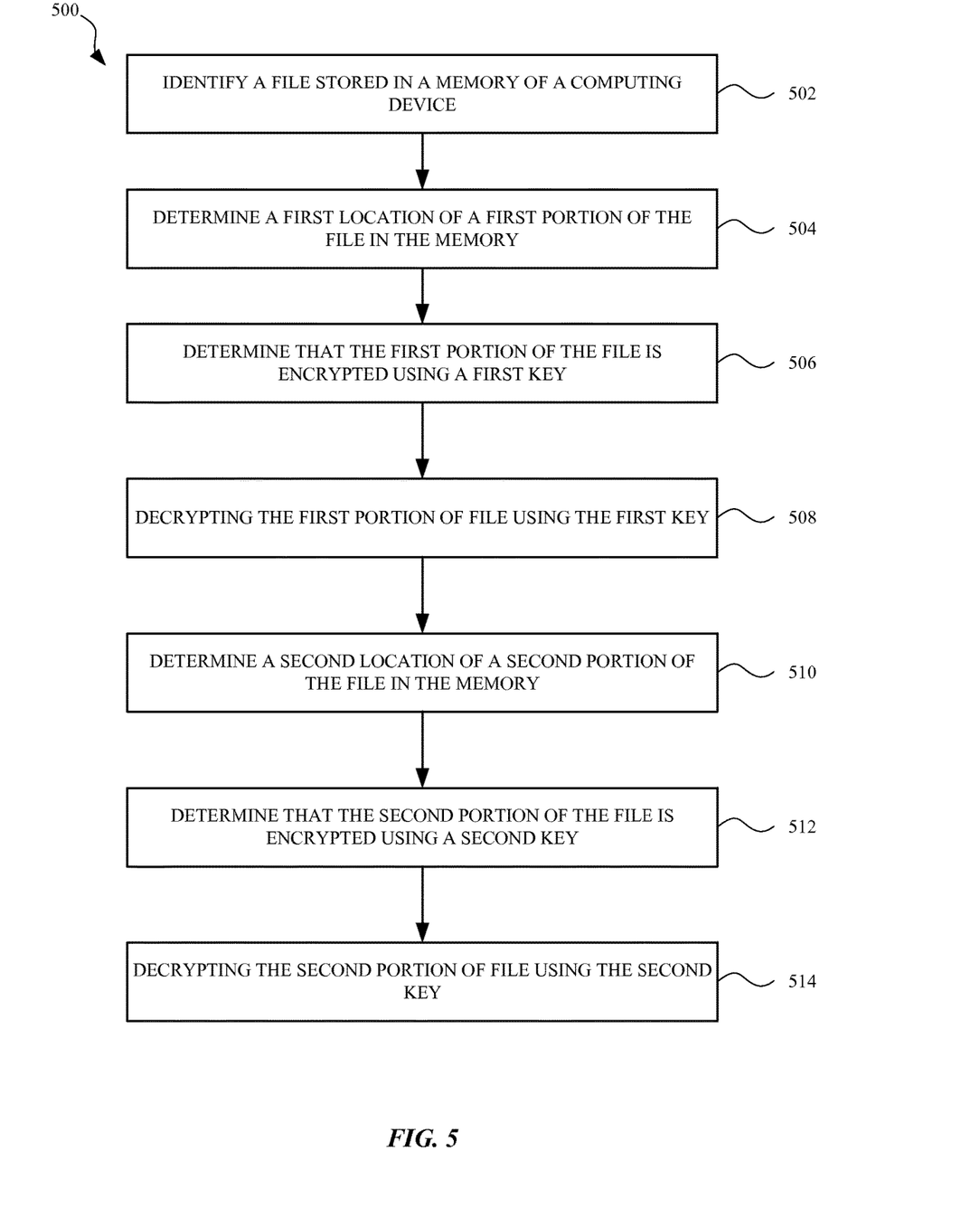
FIG. 5 illustrates a method for accessing a file that is being re-encrypted according to a key rolling process.

FIG. 5 illustrates a method 500 for accessing a file that has been or is being re-encrypted according to a key rolling process, as discussed herein. The method 500 can be performed by any suitable component or module not limited to an application, a processor, or a kernel of the computing device. The method 500 can include a step 502 of identifying a file stored in a memory of a computing device. The method 500 can also include a step 504 of determining a first location of a first portion of the file in the memory. Step 506 of the method 500 includes determining that the first portion of the file is encrypted using a first key. At step 508, the first portion of the file is decrypted using the first key. Step 510 of the method 500 includes determining a second location, different than the first location, of a second portion of the file in the memory. Additionally, step 512 of the method 500 includes determining that the second portion of the file is encrypted using a second key, different than the first key. At step 514 of the method 500, the second portion of the file is decrypted using the second key. The method 500 can be performed simultaneous to a key rolling program re-encrypting the file with the first key, the second key, or another suitable key. In some embodiments, the file can be accessed using either the first key or the second key after the file has been, or when the file is being re-encrypted according to the key rolling process discussed herein. Therefore, access to the file can require either a single key or multiple keys.

Figure 6:
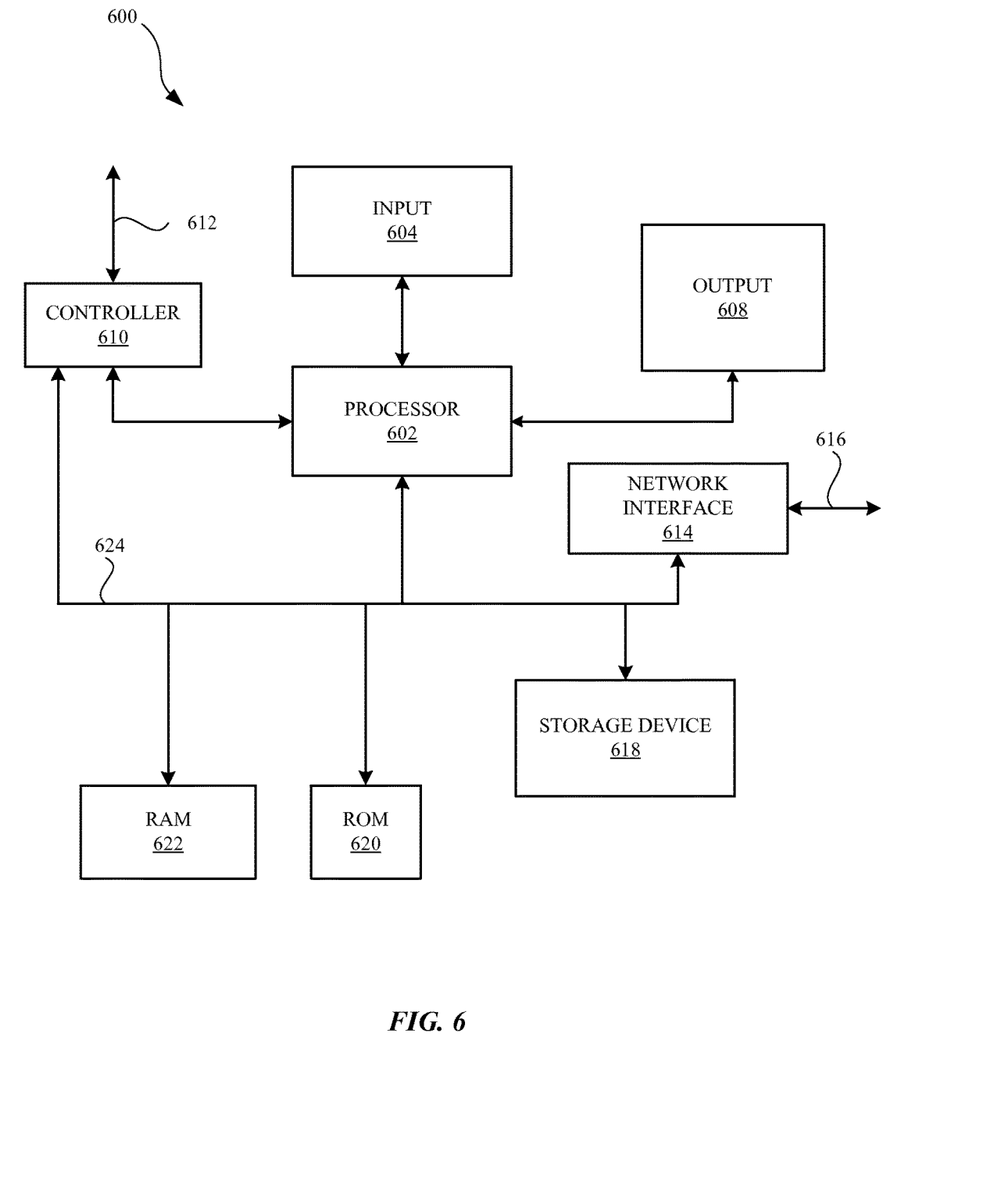
FIG. 6 is a block diagram of a computing device that can represent the components of a computing device or any other suitable device or component for realizing any of the methods, systems, apparatus, and embodiments discussed herein.

FIG. 6 is a block diagram of a computing device 600 that can represent the components of a computing device 102 or any other suitable device or component for realizing any of the methods, systems, apparatus, and embodiments discussed herein. It will be appreciated that the components, devices or elements illustrated in and described with respect to FIG. 6 may not be mandatory and thus some may be omitted in certain embodiments. The computing device 600 can include a processor 602 that represents a microprocessor, a coprocessor, circuitry and/or a controller for controlling the overall operation of computing device 600. Although illustrated as a single processor, it can be appreciated that the processor 602 can include a plurality of processors. The plurality of processors can be in operative communication with each other and can be collectively configured to perform one or more functionalities of the computing device 600 as described herein. In some embodiments, the processor 602 can be configured to execute instructions that can be stored at the computing device 600 and/or that can be otherwise accessible to the processor 602. As such, whether configured by hardware or by a combination of hardware and software, the processor 602 can be capable of performing operations and actions in accordance with embodiments described herein.

The computing device 600 can also include user input device 604 that allows a user of the computing device 600 to interact with the computing device 600. For example, user input device 604 can take a variety of forms, such as a button, keypad, dial, touch screen, audio input interface, visual/image capture input interface, input in the form of sensor data, etc. Still further, the computing device 600 can include an output 608 that can be controlled by processor 602. The output 608 can include a display device, audio device, haptic feedback device, or any other output device suitable for providing output to a user of a device. Controller 610 can be used to interface with and control different equipment through equipment control bus 612. The computing device 600 can also include a network/bus interface 614 that couples to data link 616. Data link 616 can allow the computing device 600 to couple to a host computer or to accessory devices. The data link 616 can be provided over a wired connection or a wireless connection. In the case of a wireless connection, network/bus interface 614 can include a wireless transceiver.

The computing device 600 can also include a storage device 618, which can have a single disk or a plurality of disks (e.g., hard drives) and a storage management module that manages one or more partitions (also referred to herein as "logical volumes") within the storage device 618. In some embodiments, the storage device 618 can include flash memory, semiconductor (solid state) memory or the like. Still further, the computing device 600 can include Read-Only Memory (ROM) 620 and Random Access Memory (RAM) 622. The ROM 620 can store programs, code, instructions, utilities or processes to be executed in a non-volatile manner. The RAM 622 can provide volatile data storage, and store instructions related to components of the storage management module that are configured to carry out the various techniques described herein. The computing device 600 can further include data bus 624. Data bus 624 can facilitate data and signal transfer between at least processor 602, controller 610, network/bus interface 614, storage device 618, ROM 620, and RAM 622.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable storage medium. The computer readable storage medium can be any data storage device that can store data, which can thereafter be read by a computer system. Examples of the computer readable storage medium include read-only memory, random-access memory, CD-ROMs, HDDs, DVDs, magnetic tape, and optical data storage devices. The computer readable storage medium can also be distributed over network-coupled computer systems so that the computer readable code is stored and executed in a distributed fashion. In some embodiments, the computer readable storage medium can be non-transitory.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for implementing a key rolling program that functions as a background process on a computing device, the method comprising:
   by a central processing unit (CPU) of the computing device:
      identifying a file stored in a first location of a memory, the file including a first encrypted portion encrypted using a first key and a second encrypted portion encrypted using the first key;
      allocating a reserved area of memory in a second location of the memory that is sized to accommodate the file;
      decrypting the first encrypted portion of the file using the first key to produce a decrypted first portion of the file;
      encrypting the decrypted first portion of the file using a second key that is different than the first key to produce a re-encrypted portion of the file, wherein:
         an application is allowed to access the first encrypted portion of the file using the first key while encrypting the decrypted first portion of the file using the second key, and
         the re-encrypted portion of the file duplicates information in the first encrypted portion of the file;
      storing the re-encrypted portion of the file in the reserved area of memory; and
      updating metadata associated with the file to indicate that:
         a first portion of the file is encrypted with the second key and stored as the re-encrypted portion of the file in the reserved area of memory, and
         a second portion of the file is encrypted with the first key and stored as the second encrypted portion in the first location of the memory.

2. The method of claim 1, further comprising, prior to allocating the reserved area of memory:
   accessing state data associated with the computing device; and
   determining, based on the state data, that the computing device is operating in a mode under which the key rolling program executes in a transparent manner to a user of the computing device.

3. The method of claim 1, further comprising:
   permitting, while encrypting the first decrypted portion of the file using the second key, the application of the computing device to access the second portion of the file.

4. The method of claim 1, wherein updating the metadata includes modifying an offset value that indicates a difference between the first portion of the file and the second portion of the file.

5. The method of claim 1, wherein updating the metadata includes modifying a bitmap that indicates a difference between the first portion of the file and the second portion of the file.

6. The method of claim 1, wherein the file is completely relocated to the reserved area of memory when all portions of the file are encrypted using the second key.

7. The method of claim 6, wherein the reserved area of memory reduces an overall fragmentation of different portions of the file that are encrypted using the second key.

8. A computing device configured to implement a key rolling program that functions as a background process, the computing device comprising:
   at least one processor; and
   at least one memory configured to store instructions that, when executed by the at least one processor, cause the computing device to:
      identify a file stored in a first location of a file system, the file including a first encrypted portion encrypted using a first key and a second encrypted portion encrypted using the first key;
      allocate a reserved area of memory in a second location of the file system that is sized to accommodate the file;
      decrypt the first encrypted portion of the file using the first key to produce a decrypted first portion of the file;
      encrypt the decrypted first portion of the file using a second key that is different than the first key to produce a re-encrypted portion of the file, wherein:
         an application is allowed to access the first encrypted portion of the file using the first key while encrypting the decrypted first portion of the file using the second key, and
         the re-encrypted portion of the file duplicates information in the first encrypted portion of the file;
      write the re-encrypted portion of the file to the reserved area of memory; and
      update metadata associated with the file to indicate that:
         a first portion of the file is encrypted with the second key and stored as the re-encrypted portion of the file in the reserved area of memory in the file system, and
         a second portion of the file is encrypted with the first key and stored as the second encrypted portion in the file system.

9. The computing device of claim 8, wherein the decrypted first portion of the file is encrypted with the second key simultaneous to the application accessing the second portion of the file.

10. The computing device of claim 9, wherein the decrypted first portion of the file is encrypted with the second key in response to the computing device being connected to an external power supply.

11. The computing device of claim 8, wherein the metadata is updated to identify a size of each of the first portion of the file and the second portion of the file.

12. The computing device of claim 8, wherein the at least one processor further causes the computing device to, prior to allocating the reserved area of memory:
- access state data associated with the computing device; and
- determine, based on the state data, that the computing device is operating in a mode under which the key rolling program executes in a transparent manner to a user of the computing device.

13. The computing device of claim 8, wherein the file is encrypted using more than two keys.

14. The computing device of claim 8, wherein the first key and the second key each have different times of origination.

15. A machine-readable non-transitory storage medium configured to store instructions that, when executed by a central processing unit (CPU) included in a computing device, cause the computing device to implement a key rolling program that functions as a background process on the computing device, by carrying out steps that include:
- identifying a file stored in a first location of a memory, the file including a first encrypted portion encrypted using a first key and a second encrypted portion encrypted using the first key;
- allocating a reserved area of memory in a second location of the memory that is sized to accommodate the second encrypted portion of the file;
- decrypting the first encrypted portion of the file using the first key to produce a decrypted first portion of the file;
- encrypting the decrypted first portion of the file using a second key that is different than the first key to produce a re-encrypted portion of the file, wherein:
  - an application is allowed to access the first encrypted portion of the file using the first key while encrypting the decrypted first portion of the file using the second key, and
  - the re-encrypted portion of the file duplicates information in the first encrypted portion of the file;
- storing the re-encrypted portion of the file in the reserved area of memory; and
- updating metadata associated with the file to indicate that:
  - a first portion of the file is encrypted with the second key and stored as the re-encrypted portion of the file in the reserved area of memory, and
  - a second portion of the file is encrypted with the first key and stored as the second encrypted portion in the first location of the memory.

16. The machine-readable non-transitory storage medium of claim 15, wherein the steps further include:
- accessing state data associated with the computing device; and
- determining, based on the state data, that the computing device is operating in a mode under which the key rolling program executes in a transparent manner to a user of the computing device.

17. The machine-readable non-transitory storage medium of claim 15, wherein updating the metadata comprises generating an offset value corresponding to a progress of re-encrypting the file using the second key.

18. The machine-readable non-transitory storage medium of claim 15, wherein the steps further include:
- permitting the second encrypted portion of the file to be accessed by the application on the computing device during the encrypting the decrypted first portion of the file using the second key.

19. The machine-readable non-transitory storage medium of claim 18, wherein the steps further include:
- designating, as free space, a portion of the memory previously occupied by the first encrypted portion of the file.

20. A method for implementing a key rolling program that functions as background process on a computing device, the method comprising:
- by a central processing unit (CPU) of the computing device:
  - identifying a file, including a first encrypted portion encrypted using a first key and a second encrypted portion encrypted using the first key, stored in a first location of a file system;
  - allocating a reserved area of memory in a second location of the file system;
  - decrypting the first encrypted portion of the file using the first key to produce a decrypted first portion of the file;
  - encrypting the decrypted first portion of the file using a second key that is different than the first key to produce a re-encrypted portion of the file, wherein the re-encrypted portion of the file duplicates information in the first encrypted portion of the file;
  - storing the re-encrypted portion of the file in the reserved area of memory; and
  - permitting, while encrypting the decrypted first portion of the file using the second key, an application of the computing device to access the first encrypted portion of the file and the second encrypted portion of the file at the first location of the file system using the first key.

21. The method of claim 20, further comprising:
- updating metadata associated with the file to indicate that:
  - a first portion of the file is encrypted with the second key and stored as the re-encrypted portion of the file in the reserved area of memory, and
  - a second portion of the file is encrypted with the first key and stored as the second encrypted portion in the first location of the file system.

22. The method of claim 20, wherein the file is associated with a group of users and encrypting the decrypted first portion of the file using the second key is in response to a user leaving the group.

23. The method of claim 20, wherein the first key and the second key each have different times of origination.

* * * * *